E. RONCERAY.
MOLDING APPARATUS.
APPLICATION FILED JUNE 20, 1913.

1,091,019.

Patented Mar. 24, 1914.
4 SHEETS—SHEET 1.

WITNESSES

INVENTOR.
Eugene Ronceray
by atty's
Synnestvedt & Bradley.

E. RONCERAY.
MOLDING APPARATUS.
APPLICATION FILED JUNE 20, 1913.

1,091,019.

Patented Mar. 24, 1914.
4 SHEETS—SHEET 3.

WITNESSES.

INVENTOR
Eugene Ronceray

E. RONCERAY.
MOLDING APPARATUS.
APPLICATION FILED JUNE 20, 1913.

1,091,019.

Patented Mar. 24, 1914.
4 SHEETS—SHEET 4.

WITNESSES.

INVENTOR.
Eugene Ronceray.

UNITED STATES PATENT OFFICE.

EUGÉNE RONCERAY, OF PARIS, FRANCE, ASSIGNOR TO SOCIETE ANONYME DES ETABLISSEMENTS PH. BONVILLAIN & E. RONCERAY, OF PARIS, FRANCE, A CORPORATION OF FRANCE.

MOLDING APPARATUS.

1,091,019.

Specification of Letters Patent. Patented Mar. 24, 1914.

Application filed June 20, 1913. Serial No. 774,784.

*To all whom it may concern:*

Be it known that I, EUGÉNE RONCERAY, a citizen of France, residing at Paris, France, have invented certain new and useful Improvements in Molding Apparatus, of which the following is a specification.

This invention relates to molding apparatus and it has for its primary objects the provision in automatic molding apparatus of improved means for returning the parts to operative position; the provision of improved means in apparatus of the character specified for supporting pattern plates, strapping plates and the like on the mold table; the provision of improved means for ramming cores and other depending portions of the sand mold; and in general the provision of improved molding apparatus of the character described which is simple in character, effective in operation and which reduces the time and labor involved in completing the mold.

The foregoing, together with such other objects as may hereinafter appear, or are incident to my invention, I attain by means of a construction which I have illustrated in the accompanying drawings wherein—

Figure 1:
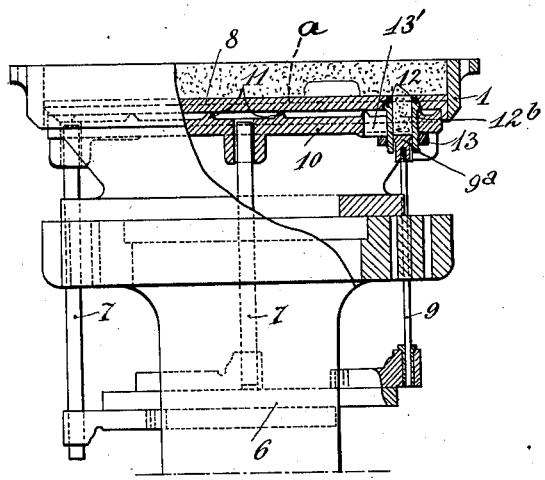
Figure 2:
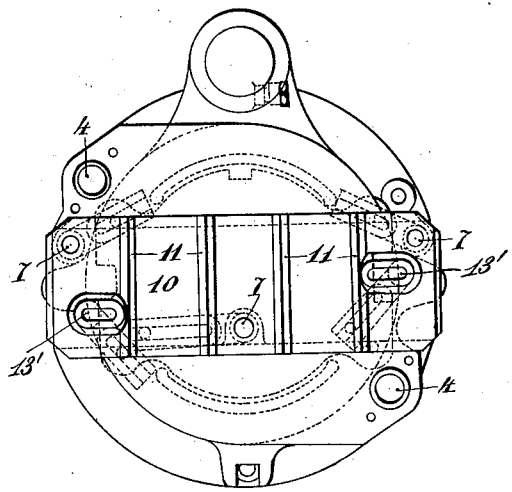
Figure 3:
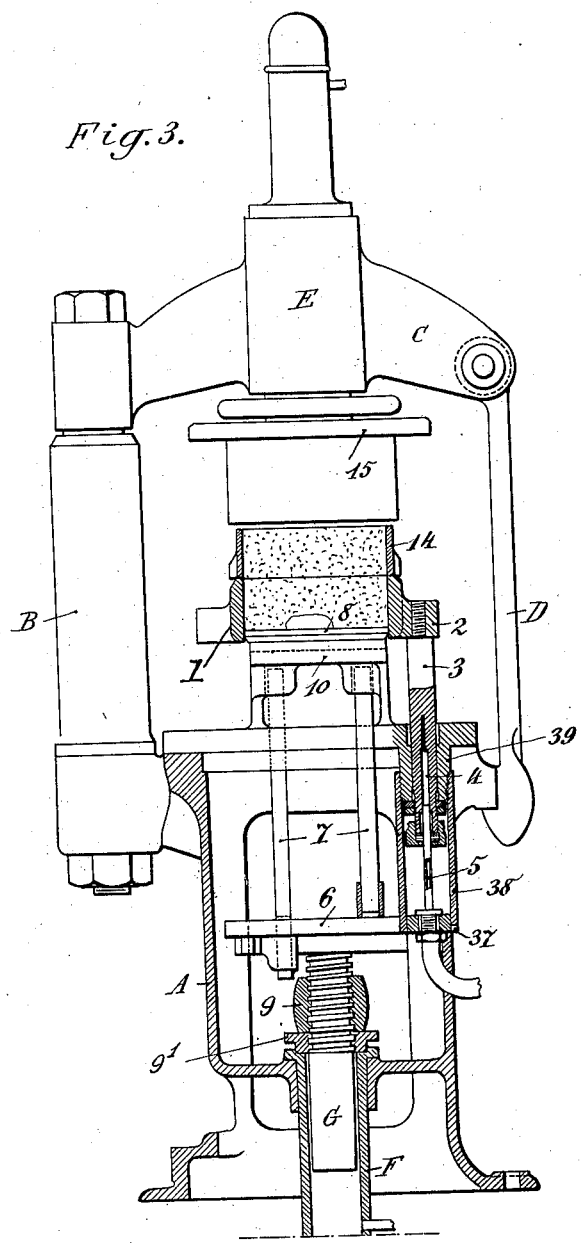
Figure 4:
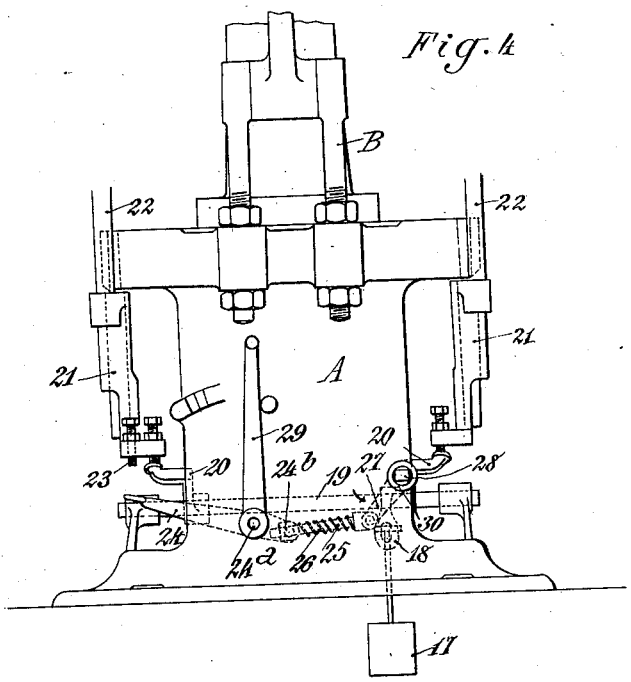
Figure 6:
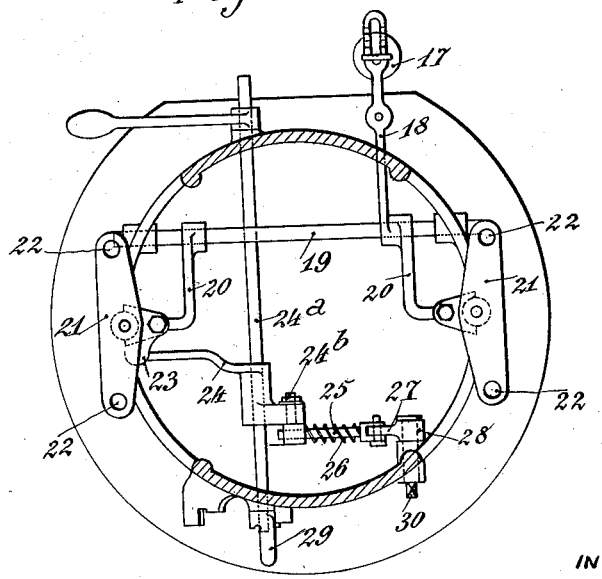
Figure 5:
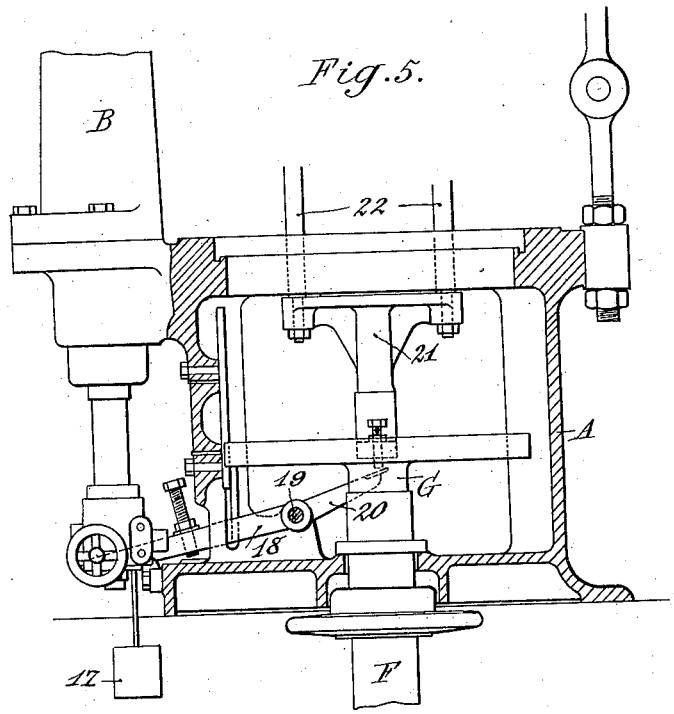
Figure 7:
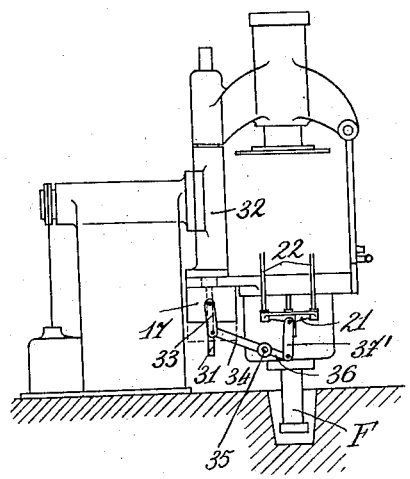

Fig. 1 is a partial elevation and section of a portion of a molding machine embodying my invention; Fig. 2 is a plan view of the device shown in Fig. 1 with portions thereof removed to more clearly illustrate the parts; Fig. 3 is a partial side elevation and section of the entire machine; Fig. 4 is a side elevation of a portion of the machine embodying a modification of my invention; Fig. 5 is a vertical section through the device of Fig. 4; Fig. 6 is a horizontal section through the device of Fig. 4 and Fig. 7 is a side elevation of a machine of the roll over type to which my invention has been applied.

Referring first to the construction illustrated in Figs. 1, 2, and 3, it will be seen that the machine therein shown comprises the usual framework A provided at one side with a vertical column B, on which is rotatably mounted a cross beam C, the outer end of which is releasably locked and braced by the hooked rod D. The cross beam C has the usual cylinder E for operating the ramming head 15. In the lower part of the frame is a second cylinder F in which is mounted a piston G, threaded at its upper end. The relative position of the piston G in the cylinder F can be varied by turning the nut and collar, $g$ and $g'$. Carried on the upper end of the piston G is a plate 6 on which are mounted the rods 7 and the rods 9, the purpose of which will appear hereinafter.

Mounted on the upper part of the frame A is a mold table or plate 10, the upper part of which fits within the sand frame 1. The frame 1 is provided with a pair of oppositely disposed lugs 2 in which are threaded the rods 3 provided with bores 4, whereby said rods in effect constitute cylinders. The cylinders 3 extend through the projections 39 formed on the bottom of the table 10, and mounted within the cylinders are hollow pistons 5 connected to any suitable source of fluid pressure, hydraulic pressure being preferred. The ends of the cylinders 3 and the pistons 5 are protected by a shell 38 threaded on the projections 39 and closed by plugs 37. These shells serve to keep the pistons in alinement and also keep out sand and dirt.

The table 10 has its upper face provided with projections 11 preferably triangular shaped ribs, upon which the stripping plate 8 and the pattern plate $a$ are adapted to rest. The advantages of this construction are that, regardless of the presence of quantities of sand which may be accidentally deposited on the mold table, the pattern plate and stripping plate will be in proper horizontal position, inasmuch as the sand will work its way between the ribs. The table 10 is provided with apertures through which the rods 7 project, the ends of the rods lying substantially flush with the upper surface of the table, and with slots 13' adapted to receive the bushings 12 positioned by the nuts 13 and adapted to receive the heads of the rods 9. The bushings are provided for the reception of cores $12^b$ or other depending mold parts and the rods 9 support such portions when the mold is stripped, as will appear.

The operation of the apparatus is as follows; The rod D is unlocked, the beam C swung to one side and the flask 14 placed on the sand frame 1 which is in the position indicated in Fig. 3, being normally held in such position by the hydraulic pressure constantly supplied the cylinders 3. The pattern and stripping plates being placed on the mold table, the flask and frame 1 are filled with sand and the pressure is admitted to the cylinder E to bring the ramming head 15 down. The ramming head pushes the flask 14 and frame 1 downwardly until the latter comes into contact with any suitable blocks placed on top of the base of the table 10, the movement of the parts effecting the ramming of the mold. The frame 1 moves downwardly with the head 15 for the reason that it is only yieldingly held in upper position. Pressure is now exhausted from the cylinder E and admitted to cylinder F and the piston G, plate 6, rods 7, and rods 9 are elevated. The rods 7 and 9 slide through the apertures in the table 10 and the former take against the stripping plate lifting it, the sand mold, and flask and draw the pattern from the mold. The rods 9 support cores and the like during this movement. The cross beam C is swung out of the way and the flask is removed. In the meantime, the pressure in the cylinders 3 elevates the frame 1 to normal position and the apparatus is in condition for another operation.

The apparatus is simple and its operation rapid, while the automatic features effect considerable saving in time and labor. The provision of means whereby the pattern and stripping plate will lie in flat, horizontal position is also advantageous.

It will also be observed that the cores 12$^b$ will not be rammed to the same degree of hardness as other parts of the mold. To overcome this I provide the rods 9 with adjustable heads 9$^a$ which lie in the bushings 12 and make the depth of the cores slightly greater than required in the mold. As the stripping movement is begun, the heads 9$^a$ compress the cores slightly before the rods 7 take against the stripping plate because of the lost motion between the rods 7 and the stripping plate. By adjusting the heads 9$^a$, the cores are packed to the proper hardness and compress to proper size.

For purposes of clearness in Fig. 1, the flask has been removed, in Fig. 2 the stripping plate has been removed, and in Fig. 3, but one of the cylinders 3 appears owing to the fact that the cylinders are diagonally disposed.

Referring now to Figs. 4, 5, and 6, I have there illustrated the lower part of a machine operating in the same manner and having the same general construction as that previously described and I have, therefore, only shown the lower part of the machine containing a modified apparatus for supporting the frame 1 for yielding movement. This apparatus corresponds to the hydraulic cylinders and comprises the rods 22—adapted to carry the frame 1,—mounted in the blocks 21 on opposite sides of the frame A; the lever arms 20 mounted on the rock shaft 19 carried by the frame A; and the counter balance lever 18 mounted on the shaft 19.

The arms 20 are adapted to take against the bottom portions of the blocks 21 and the weight 17 on the lever 18 normally tends to rotate the shaft 19 in such manner as to move the arms 20 to elevate the blocks 21 and rods 22. Provision is made for adjusting the elevation of the blocks 21 by means of the studs shown. When the ramming operation takes place, the ramming head forces the frame 1 and the rods 22 downwardly against the weight 17, and when the ramming head is retracted, the weight returns the plate to normal position.

On downward movement of the blocks 21, an abutment 23 on one of said blocks comes into engagement with an arm 24 mounted on a rock shaft 24$^a$ carried in the frame A. At the inner end of said arm 24, the pin 24$^b$ is rotatably carried, such pin being provided with a sleeve adapted to slidably receive the rod 25 having a clevised engagement with the arm 27 rotatably carried by the pin 28 threaded into the frame A. The rod 25 carries a spring 26 normally tending to rotate the arm 27 in the direction of the arrow (Fig. 4). The downward movement of the blocks 21 causes the arm 24 to rotate the arm 27 against the pressure of the spring, and the movement of the arm 27 operates a valve (not shown) for controlling the admission of fluid pressure into the cylinder F. A foot treadle is provided at one end of the shaft 24$^a$ and a hand lever 29 at the other end in order that the arm 27 may be actuated at will. By this construction the admission of fluid pressure into the lower cylinder to accomplish the stripping of the mold automatically takes place at the close of the ramming operation. In case it is desired to eliminate the automatic operation just above described, a suitable lever is applied to the squared end 30 of the pin 28 and the latter is turned until the arm 27 is firmly clamped to the frame A in lower position.

In Fig. 7, I have shown the same arrangement applied to a machine of the roll over type. The rods 22 and blocks 21 in this case are elevated by the rods 37', arms 36 mounted on the rock shaft 35, and arm 34 mounted on the rock shaft at one end and connected at the other end to the counter balance weight 17 by the links 33, the weight being slidably mounted on the rod 31. In one position of the machine the weight tends to elevate the rods 22 toward the ramming piston and in the other position, away from said piston toward the stripping piston.

What I claim is:

1. A molding machine comprising in combination a relatively fixed pattern support, a movable frame adjacent thereto and together with the support constituting in effect a false flask, a flask above the frame, a ramming member adapted to advance the flask and frame toward the pattern support, a means for drawing the mold, and means whereby the frame is yieldingly held in position adjacent the pattern support.

2. A molding machine comprising in combination a relatively fixed pattern support, a stripping plate, a movable sand frame around the support and plate, a flask on the frame, a ramming member adapted to move the flask and frame toward the support and plate, means for elevating the stripping plate, mold, and flask to draw the mold, and means yieldingly maintaining the frame in operative position around the support and plate.

3. A molding machine comprising in combination a table, a pattern plate and a stripping plate carried thereby, a movable sand frame adapted to retain the sand over the pattern and stripping plates, a flask over the frame, means for moving the flask and frame to ram the sand, means for elevating the stripping plate and with it the mold and flask to strip the mold from the pattern, and a fluid pressure means for yieldingly maintaining the frame in upper position.

4. A molding machine comprising in combination a table, a pattern plate and a stripping plate carried thereby, a movable sand frame adapted to retain the sand over the pattern and stripping plates, a flask over the frame, means for moving the flask and frame to ram the sand, means for elevating the stripping plate and with it the mold and flask to strip the mold from the pattern, and means independent of the means for elevating the stripping plate for yieldingly maintaining the frame in upper position.

5. The combination of a molding machine comprising a table, pattern plate and stripping plate, of a sand frame having telescopic relation with the table and adapted to retain the sand in position over the pattern and stripping plates, means for yieldingly maintaining the frame in upper position, means for ramming the sand, and means elevating the stripping plate to strip the mold.

6. A molding machine comprising a table, a stripping plate carried thereby having an aperture adapted to receive a sand core, a flask, a block for supporting the core, a movable member adapted to elevate the stripping plate to strip the mold, there being slight lost motion between the stripping plate and the movable member, the said block being movable with said member.

7. A molding machine comprising in combination a relatively fixed pattern support, a movable frame adjacent thereto and together with the support constituting in effect a false flask, a flask above the frame, a ramming member adapted to advance the flask and frame toward the pattern support, a means for drawing the mold, and means whereby the frame is yieldingly held in position adjacent the pattern support, said last means comprising a cylinder and a fluid actuated piston therein supporting the frame.

8. A molding machine comprising in combination a relatively fixed pattern support, a movable frame adjacent thereto and together with the support constituting in effect a false flask, a flask above the frame, a ramming member adapted to advance the flask and frame downward toward the pattern support, a piston adapted to move upwardly to draw the mold, and a second piston normally pressure-held in upper position for holding the frame in operative relation with the pattern support.

9. A molding machine comprising in combination a relatively fixed pattern support, a movable frame adjacent thereto and together with the support constituting in effect a false flask, a flask above the frame, a ramming member adapted to advance the flask and frame downward toward the pattern support, a centrally located main cylinder having a piston adapted to move upwardly to draw the mold, and a pair of cylinders adjacent the main cylinder having pistons under constant pressure supporting the frame in elevated operative relation with the pattern support.

10. A molding machine comprising in combination a relatively fixed pattern support, a movable frame adjacent thereto, a flask above the frame, a ramming member adapted to advance the flask and frame toward the pattern support, a means for drawing the mold, and means whereby the frame is yieldingly held in position adjacent the pattern support, said last means comprising a cylinder and a fluid actuated piston therein supporting the frame.

11. A molding machine comprising in combination a relatively fixed pattern support, a movable frame adjacent thereto and together with the support constituting in effect a false flask, a flask above the frame, a ramming member adapted to advance the flask and frame toward the pattern support, and means whereby the frame is yieldingly held in position adjacent the pattern support.

In testimony whereof I have hereunto signed my name in the presence of the two subscribing witnesses.

EUGÉNE RONCERAY.

Witnesses:
HANSON C. COXE,
EDMOND JACQUOT.